Sept. 22, 1970   G. P. SCHELL ET AL   3,529,803
QUICK-ACTING PILOT VALVE
Original Filed April 7, 1965   2 Sheets-Sheet 1
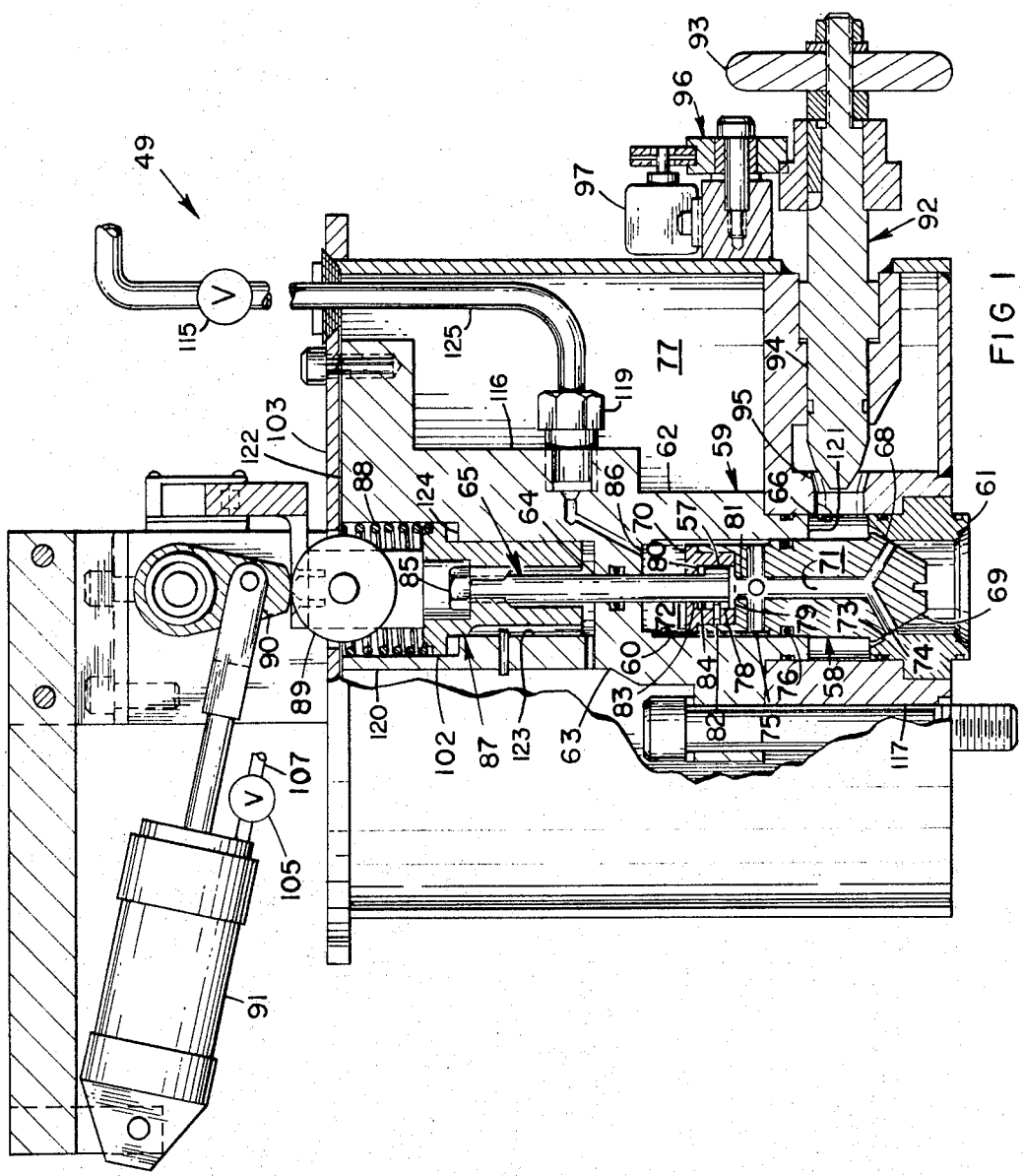
GENE P. SCHELL
CHARLES J. STALMACH, JR.
INVENTORS
BY *Charles W. McHugh*
AGENT

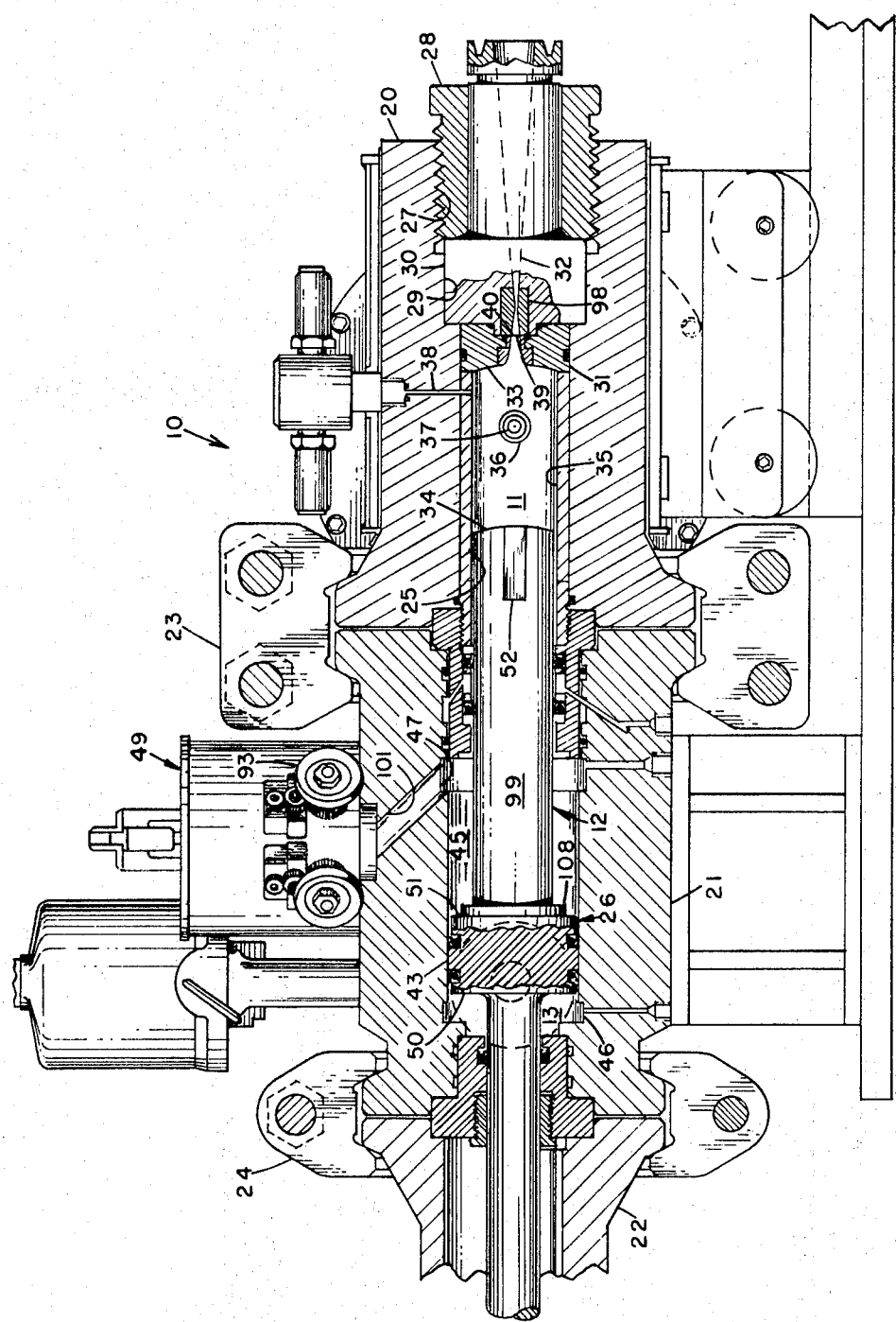

United States Patent Office 3,529,803
Patented Sept. 22, 1970

---

3,529,803
QUICK-ACTING PILOT VALVE
Gene P. Schell, Irving, and Charles J. Stalmach, Jr., Grand Prairie, Tex., assignors to LTV Aerospace Corporation, Dallas, Tex., a corporation of Delaware
Original application Apr. 7, 1965, Ser. No. 446,190, now Patent No. 3,418,445. Divided and this application Sept. 6, 1968, Ser. No. 757,970
Int. Cl. F16k 39/02
U.S. Cl. 251—58          1 Claim

ABSTRACT OF THE DISCLOSURE

A quick-acting, high-pressure valve which is movable from a closed position to an open position as a result of movement of a pilot element from a position where it does not bear against a main valve stem to a position where it does bear against the stem, with the pilot element being continuously immersed in and subject to the pressures of a fluid being contained by action of the valve.

---

This is a division of application SN 446,190 filed Apr. 7, 1965, entitled, "Apparatus For Supplying High Energy Gas Streams to a Wind Tunnel," now U.S. Pat. No. 3,418,445.

This invention relates to valves for blocking the flow of fluid until release of said fluid is desired, and more particularly it relates to valves which are substantially pressure balanced and are actuated by a pilot element.

The desire to study phenomena related to high Mach number gas dynamics has prompted many approaches to the problems of providing gas at suitable pressures, temperatures, enthalpies, etc. for useful testing periods. One of the more promising approaches has been the use of "hot-shot" wind tunnels in which a large quantity of electrical energy is substantially instantaneously discharged across two spaced electrodes, and the heat generated by the discharge is transferred to the gas between the electrodes. The heated gas is then vented through an accelerating nozzle into the test section of a wind tunnel. While such an apparatus may provide quite high initial temperatures and pressures in the discharge or arc chamber, these values are rapidly reduced as the gas is vented to the wind tunnel. In fact, usable run times for tests are seldom as high as 50 milliseconds even at Mach numbers considered relatively modest for a high-performance, hypervelocity wind tunnel.

An improvement over the above-described apparatus has been described in the U.S. Pat. 3,418,445 previously referred to, and basically consists of a means for reducing the volume of the arc chamber as the heated gas is being vented therefrom. Thus, the pressure and temperature of gas in the arc chamber are kept at desired values for the entire duration of a test, thereby avoiding (among other things) the pressure decay which accompanies the flow of heated gas out of a fixed-volume arc chamber.

While variable-volume arc chambers have appreciably extended the possible duration of a wind tunnel test, such extended tests still only last, usually, for a few seconds, or fractions of a second. Hence, the entire operation of a tunnel may likely be complete in, say, one second. Under such circumstances it will be apparent that a valve which is an integral part of the system must be a quick-acting valve, i.e., one whose response is most conveniently measured in microseconds or milliseconds.

Accordingly, it is a major object of this invention to provide a quick-acting valve.

Another object is to provide a pilot-type valve wherein that part of the valve which first moves during opening is lighter and easier to move than is the main flow-blocking element.

A further object is to provide a valve wherein the pressure of fluid being blocked by the valve serves to hold the blocking element in position, and also serves to move the element out of the way to permit fluid flow at the desired time.

These and other objects will be apparent from the specification and claims from the accompanying drawing which is illustrative of the invention.

In the drawing:

FIG. 1 is a partially cross-sectional view of a quick-acting valve made in accordance with the invention; and FIG. 2 is a longitudinal, cross-sectional view of a variable-volume arc chamber with the valve of FIG. 1 shown installed, at 49, on top of the apparatus for varying the volume of the arc chamber, the installed position of the valve being rotated approximately 90° from the position shown in FIG. 1.

Referring initially to FIG. 1, the valve 49 is illustrated in the configuration in which it has been combined with a wind tunnel apparatus. It should be obvious, however, that the valve is not limited to use with wind tunnels. That is, the valve 49 has utility in its own right, apart from its utility as a component of an arc-chamber apparatus, and may be used wherever it is desired to block the flow of a fluid until a desired time, and then to quickly permit flow of said fluid. By way of example, then, it is believed that the construction and operation of the valve can best be taught by describing its use in conjunction with a wind tunnel; but by so describing the valve, it is not intended to inferentially limit the scope of coverage of the appended claim.

Examining the arc chamber apparatus first, then, the apparatus depicted in FIG. 2 comprises a housing 10 enclosing a chamber 11, a volume-reducing means including a piston assembly 12, and a resilient means such as a compartment 13 of compressed gas for moving the piston assembly into the chamber, a source of pressurized gas and means for transferring the gas to the chamber (not shown), and a heating means. A wind tunnel is typically connected with the chamber 11 through a nozzle 32, and a vacuum tank is usually provided to receive the gas after it has been vented from the chamber and served its purpose during a test. As will be more fully explained herein, the volume-reducing means is operable for reducing the volume of the chamber 11 in coordination with the operation of the heating means. The housing 10 has a central bore 25, one portion of which comprises the arc chamber 11, and another portion of which comprises an activating chamber 26 for receiving certain fluids. The piston assembly 12, slidably movable within the bore 25, has a first end 34 which constitutes a movable wall spaced from a fixed wall 33, the fixed wall and the movable wall and the cylindrical surface 35 of the bore 25 therebetween defining the closed, variable-volume arc chamber 11. The first end 34 of the piston assembly 12 preferably has a configuration that closely matches that of the surface of fixed wall 33, to the end that a near-minimal volume remains between the fixed wall and the movable wall when the walls are adjacent one another at the conclusion of a test, and substantially all of the heated gas has been vented to the wind tunnel. The cylindrical surface or wall 35 of the chamber 11 has at least one pair of diametrically spaced orifices, represented by the orifice 36, through which at least one pair of electrodes 37 (not shown) communicates with the interior of the chamber. The electrodes 37, which are electrically insulated from the cylinder wall 35 and sealing fill the orifices 36, comprise a part of an electric arc heating means. The arc chamber 11 has an inlet 38 for the introduction of a predetermined quantity of gas (for example, nitrogen) from a source of pressurized gas. A discharge orifice 39 in the fixed wall 33 is initially stopped, i.e., sealing covered, by a means such as a rupturable diaphragm 40 before the arc chamber 11 is filled with gas; a typically employed material for such a diaphragm is Mylar having a thickness of 0.0075 inch. The discharge orifice 39 and the rupturable diaphragm 40 together comprise means for establishing communication between the wind-tunnel nozzle 32 and the arc chamber 11 in coordination with the operation of the heating and volume-reducing means. The piston assembly 12 has an annular projection 43 between its first end 34 and its second end, which projection constitutes a piston sealing accommodated in the activating chamber 26. The annular projection 43 divides the activating chamber 26 into a first compartment 13 and a second compartment 45 adapted to contain "working" kuids therein, said working fluids being so described in contradistinction to "testing" fluids which are vented to the wind tunnel. The first working fluid in said first compartment 13 serves as a biasing means to bias the movable wall 34 toward the fixed wall 33 of the arc chamber 11, there being suitable structural connection between the piston 43 and the movable wall 34. The first fluid is preferably a pneumatic fluid, and when unopposed, serves as a means for urging the movable wall 34 from a first position spaced from the fixed wall 33 to a second position closer to the fixed wall. A convenient pneumatic fluid is nitrogen, which is often supplied at a pressure of 15,000 p.s.i., this being a pressure which is occasionally necessary to accelerate and maintain the piston 12 at a desired velocity without oscillations. The ratio of the cross-sectional areas of the activating chamber 26 and the arc chamber 11, and the maximum expected arc chamber pressure, defines the necessary pressure of the first working fluid. The second working fluid is preferably a hydraulic fluid, for example, Cellulube 220 manufactured by the Celanese Corporation of America. The hydraulic fluid, when under pressure, serves to oppose the movement of the piston 43 toward the fixed end 33. The second working or blocking fluid, being a liquid, is substantially incompressible; thus, even a presrure of 30,000 p.s.i. on the fluid can be almost instantaneously reduced to any desired value with a suitable quick-acting valve 49. Since it is desirable to move a minimum volume of fluid during operation (in order to minimize valve size and the inertia of the moving parts of the system), the ring projection 43 which has one annular face 50 exposed to a first fluid and a second annular face 51 exposed to a second fluid is so designed that a smaller effective area is operated on by the second (liquid) working fluid than by the first (pneumatic) working fluid. The smaller effective area directly and advantageously contributes to a smaller volume in the second compartment 45, which means that a smaller quantity of liquid must be moved in the operating system. Since a hydraulic pressure of approximately 30,000 p.s.i. is reasonably obtainable, and a nominal pressure of 15,000 p.s.i. is frequently employed in the first pneumatic compartment 13, an effective area ratio of approximately 1 to 2 is provided between the two annular faces 50, 51 of the ring projection 43. Thus, the hydraulic blocking means has an operating pressure approximately twice that of the pneumatic biasing means, but it is only operative on approximately one half the area; the two means then are approximately equal in magnitude or effectiveness and the piston 43 remains static until the hydraulic pressure is controllably released.

The apparatus further includes a heating means for controllably heating said predetermined quantity of gas in the chamber 11, which is a means for discharging a predetermined amount of electrical energy across two spaced electrodes 37 as a high-temperature spark.

Having briefly described the variable-volume arc chamber, etc., attention will now be focused more directly on the valve 49 which constitutes the subject invention. The quick-acting valve 49 shown in FIG. 1 is a critical element in the entire wind tunnel apparatus, for it must controllably release as much as 30,000 p.s.i. hydraulic pressure almost instantaneously, whereby the piston assembly 12 may quickly accelerate and move into the arc chamber 11 driving heated test gas through the discharge orifice 39 before said gas has experienced any undesirable changes in its parameters, e.g., pressure and temperature.

The release valve 49 is characterized as a substantially pressure-balanced valve, and may also be described as a pilot-type valve, in that the variable position of a small pilot element 57 determines the balance of pressure forces which bias a main valve stem 58 toward a first or a second position. The valve 49 comprises a housing 116 which has respective first and second end portions 62 and 120 and a cylindrical, composite sleeve 59 which is composed of the housing first end portion 62, a generally cylindrical structure 117, and an annular member 61. The annular member 61 will also be referred to as the first end portion of the composite sleeve 59, and housing first end portion 62 will also be referred to as the second end portion of the composite sleeve 59. Housing first end portion 62 has an end face 121 which is pierced by an axial bore 60, and housing second end portion 120 has an end face 122 which is pierced by a cylindrical recess 123. The axial bore 60 and the cylindrical recess 123 are coaxial with each other and terminate at a location intermediate the respective housing first and second end portions 62, 120, thus forming a wall 63 which is perpendicular to the axes of the cylindrical recess 123 and the axial bore 60. The internal diameter of the cylindrical recess, between the housing second end portion face 122 and a location intermediate the end face 122 and wall 63, is larger than the remaining portion of the cylindrical recess; the juncture of the two cylindrical recess internal diameters forms a shoulder 124. Said composite sleeve 59, as before mentioned, has a first end portion 61 and a second end portion 62, the first end portion being in communication with the second compartment 45 through a housing wall passage 101 (FIG. 2). In its relationship to the valve 49, the second compartment 45 is functionally equivalent to a pressure vessel which has therein a fluid under high pressure and, consequently, the second compartment 45 will be referred to as the pressure vessel 45. The second end portion 62 of the composite sleeve is closed with a suitable means such as wall 63 (FIG. 1). The wall 63 closing the composite sleeve second end portion 62 has a port 64 for sealing and slidably accommodating a rod member 65, the rod having a purpose which will become apparent in a later paragraph. The composite sleeve 59 further has one or more radial discharge orifices such as orifice 66, between its first and second end portions 61, 62. Discharge orifice 66 is more precisely described as located in structure 117 which, as before mentioned, is one of the three components that cooperate to form composite sleeve 59. An annular internal valve seat 68 is annularly disposed in the composite sleeve 59 between the sleeve connection of the first end portion 61 (annular member 61) with the passage 101 (FIG. 2) from the pressure vessel 45 and the one or more discharge orifices such as 66, the seat being economically achieved by the simple expedient of making the internal diameter of the annular member 61 slightly less than the internal diameter of the axial bore 60 in housing first end portion 62. The valve stem 58 quite naturally is slidably movable within the composite sleeve 59. The stem 58 has a first end portion 69 and a second end portion 70 and a passage 71 extending therebetween. The stem second end portion 70 and the wall 63 and that portion of the bore 60 therebetween, in combination, form a sleeve chamber 72 above the stem 58. The stem first end portion 69 has a surface 73 which is shaped for mating with the valve seat 68, to selectively block the flow of a fluid through the valve and out of the discharge orifice 66. The stem passage 71 has a first opening 74 which communicates with the second compartment (pressure vessel) 45 at all positions of the valve stem 58, including the position at which the stem surface 73 bears against the valve seat 68. A second end 75 of the stem passage 71 is in communication with sleeve chamber 72, whereby said sleeve chamber is in communication with the second compartment 45 through passages in valve stem 58. The stem 58 further has a suitable, external, peripheral sealing means 76 such as an O-ring or the like in a location between the sleeve discharge orifice 66 and the sleeve chamber 72. Thus, with the stem end surface 73 bearing against the valve seat 68, the discharge orifice 66 is sealed off from the second compartment 45 (which is below) and further sealed off from the sleeve chamber 72 (which is above the orifices). In other words, the valve seat 68, the O-ring 76, and that portion of the stem 58 therebetween, constitute a means for selectively blocking the discharge orifice. Only when the valve stem 58 is lifted from its sealed position in which it bears against seat 68 can pressurized fluid in the second compartment 45 flow externally around the stem first end 69 to the discharge orifice 66 and thence to a reservoir or a relatively low-pressure drainage tank 77.

The pilot element 57 is designed to forcibly bear against the valve stem 58 at appropriate times, and is at all times retained in a cavity 78 located in the stem second end portion, the cavity having a bottom wall 79, a top wall 80, and an opening 81 in the bottom wall serving as means for communicating with the stem passage 71, whereby fluid in the second compartment 45 and sleeve chamber 72 is also admitted to the cavity. The pilot element 57 fits somewhat loosely within the cavity 78 so that fluid may freely pass from the bottom of the cavity around the pilot element to the top of the cavity. A guide pin 82 riding in a suitable pilot element slot is included to prevent unwanted rotation of the pilot element 57 within the cavity 78 while allowing linear movement of the element. A port 83 in the top wall 80 of the cavity 78 is concentric with and approximately equal in size to the port 64 in the wall 63, said port 83 being adapted to slidably receive the rod member 65. The rod member 65 has a first end 84 which is rigidly attached to the pilot element 57, and a second end 85 which is outside of the sleeve 59, whereby the pilot element may be positioned within the cavity 78 by moving the rod second end. The pilot element 57, a rod member 65, and the valve stem 58 have respective surface areas such that the net, total surface area of the stem subjected to forces of fluid from the second compartment (pressure vessel) 45 urging the stem toward the valve seat 68 is greater than the area of the same subjected to fluid forces in the opposite direction when the pilot element 57 is in its first position and such that the net, total surface area of the pilot element 57, rod member 65, and valve stem 58 subjected to forces of fluid from the second compartment 45 urging the stem away from the valve seat is greater than the area of the same subjected to fluid forces urging the stem in the opposite direction when the pilot element is in its second position. The positioning of the rod member 65 and pilot element 57 will be more fully discussed later. The pilot element 57 is shown in this first position in FIG. 1.

The rod member 65 is connected at its second end 85 to a guide means 87 which includes a sleeve or collar 102 rigidly mounted on the rod member second end 85, a coiled spring 88 footed on the collar 102 and placed in compression between said collar and a continuation of the tank upper wall 103, and further includes a roller 89, the roller being adapted to cooperate with a cam 90. The cam 90 is preferably rotatable by an actuator or air cylinder 91, and has a first, unactuated position shown in FIG. 1. In moving to this first position, the cam 90 forces the roller 89 and rod member 65 downwardly, whereby the pilot element 57 is prevented from bearing against the cavity top wall 80. The cam 90 has a second, actuated position in which the rod member 65 is free to move axially in response to fluid pressure on the pilot element 57. Because of the configuration of the pilot element 57 and the attached rod 65, when the composite sleeve 59 is filled with a compressed fluid, the pilot element 57 will move upward, if it is not restrained, until it reaches a second position at which it bears against the upper wall 80 of the stem cavity 78, adding its area to the effective area of the stem 58 on which the fluid pressure acts. The pilot element 57 and the valve stem 58 have dimensions that are suitably proportioned such that when the pilot element does bear against the cavity upper wall 80, the stem will be unseated by the same pressure that caused the stem to be tightly seated while the pilot element was spaced from the cavity upper wall.

Before any liquid is admitted to the sleeve chamber 72, second compartment (pressure vessel) 45, stem passage 71, and stem cavity 78, the compression spring 88 exerts an initial seating force downward on the rod member 65, thereby biasing the pilot element 57 against the bottom wall 79 of the valve stem cavity 78. The force exerted by the pilot element 57, in turn, biases the valve stem 58 downward until it bears against the seat 68. The second compartment 45 and composite sleeve 59 are filled with fluid through port 86 which penetrates the composite sleeve through wall 63 and has a high-pressure fitting 119 connected to a source of high-pressure fluid (not shown) by tubing 125 and shutoff valve 115. Once the composite sleeve 59 and pressure vessel 45 are filled with fluid under high pressure, the valve 115 is closed. When the liquid is pressurized the downward force by the spring 88 is eventually overcome, and the pilot element 57 is urged upward away from the bottom wall 79 of the stem cavity 78 and held in its first position, spaced from top wall 80 of stem cavity 78, by cam 90 in cooperation with roller 89, collar 102 and rod member 65. In one particular example, pressure forces incident to the presence of the liquid in the valve at 30,000 p.s.i. tightly seat the valve stem 58 with a force of approximately 24,700 lbs., which is about 1,200 lbs. greater than the force tending to unseat the stem. In spite of the relatively high pressure of the fluid being contained, however, a pressure load of only about 2,300 lbs. is transmitted to the cam 90 at this pressure. Since the cam 90 is subjected to comparatively small loads, the cam bearings (not shown), as well as all the other parts related to the operation of the cam, can be made light and small, which further contributes to the low inertia and quick response of the valve.

Another valve 105 controls the operation of the actuator 91 which is activated by compressed air provided from a compressed air source (not shown) through tube 107. The rod member 65 provides a convenient location for attaching a tripping means external to the composite sleeve 59 for activating the heating means. For example, a tripping means such as a detent fixed on the rod 65 may activate or trip a microswitch as the rod and valve stem move upward during the liquid discharge operation. The position of the tripping means or the microswitch should be adjustable, such that the discharge of said electrical energy across the electrodes 37 (which ordinarily takes place within about 0.1 millisecond) may be set for any predetermined time in relation to the release of the second pressurizing fluid from the second compartment 45, e.g., prior to or subsequent to said release.

Sometimes it may not be necessary to drain the liquid from the second compartment 45 as rapidly as the release valve 49 will permit. Accordingly, regulating means such as one or more adjustable needle valves are provided between the second compartment 45 and the drainage tank 77. A single, representative needle valve 92 is shown with a manually adjustable handle 93, and a stem 94 which is axially movable with respect to a valve seat 95 in the discharge orifice 66 in the composite sleeve 59. The degree of restriction of the discharge orifice 66 thus determines the speed with which the fluid drains from the second compartment 45, which, in turn, affects the speed at which the piston assembly 12 can move into the arc chamber 11. If the stem 94 of the representative needle valve 92 is fully backed away from its seat 95 such that there is no great restriction imposed on flow by the stem, the liquid will be simply pushed out of the compartment 45 as the piston 43 moves forward; even so, the liquid mass flow out of the second compartment imparts at least some control to movement of the piston assembly 12. Therefore, the needle valves represented by valve 92 are properly characterized as providing not merely control, but a range of control, over the velocity of the piston assembly 12. As an optional refinement, each of the needle valve stems (of which stem 94 is representative) is coupled with suitable gears 96 to an ordinary revolution counter 97, the counter being externally mounted on the valve 49, whereby the position of a valve stem 94 with respect to its valve seat 95 may be readily determined as the value stem is manually rotated.

In operation of the invention, the piston assembly 12 is positioned to provide a desired initial volume of the arc chamber, and gas flow into the arc chamber 11 is permitted until a desired gas pressure is attained therein. The blocking fluid is then admitted to the second compartment 45 through the valve 49 and passage 101. The first working fluid is then admitted from a gas source to the first compartment 13, and the pressure is increased therein until a desired value is obtained. A source of electrical energy is then made ready. To begin a test, the valve 105 is activated, which causes the rod of actuator 91 to retract, rotating the cam 90 from a first position in which it holds pilot element 57 in its first position, through the cooperation of roller 89, collar 102, and rod member 65, to a second, actuated position in which the roller 89 is thus allowed to rise, which causes the rod element 65 to rise and, in turn, causes the pilot element 57 to rise to its second position and thus to bear against the cavity upper wall 80. The pressure of the fluid in composite sleeve 59 acting on the stem 58 and on the contiguous pilot element 57 causes the stem to be unseated, which allows the fluid to flow out of the second compartment 45 through the discharge orifice 66 into the tank 77. With the effect of the fluid removed, the piston assembly 12 quickly begins to move toward the chamber fixed end 33. In conjunction with movement of the piston assembly 12, an appropriate linkage causes the electrical energy to be discharged across the electrodes 37, and the temperature of the gas in the arc chamber 11 is substantially instantaneously heated. The diaphragm 40 in the discharge orifice 39 is disintegrated as a result of the temperature and/or pressure increase which accompanies the electrical discharge, and the heated gas begins to flow out of the arc chamber 11 into the nozzle 32 and thence to the wind tunnel. The piston assembly 12 continues to move into the arc chamber 11, reducing the volume of the chamber as the gas is vented to the nozzle 32.

The degree of closure of the one or more of the needle valves, e.g., valve 92, easily and conveniently affects the speed with which liquid is drained from the second compartment 45, which in turn affects the velocity of the piston assembly 12 as it moves toward the chamber fixed end 33. If desired, the manually adjustable needle valve 92 shown and described can be replaced by an automatic valve, e.g., a solenoid-actuated valve, which could provide a variable rate of discharge and thus a variable piston acceleration and velocity during a single test. With any chosen valve, the discharge rate is adjustable to some degree, and the problem of unwanted pressure decay which is inherent in previous arc chambers is not found in this apparatus.

It should be evident that the success of the entire variable-volume arc chamber is due in large part to the speed of response of the valve 49. Such speed is not necessarily unique in valves, per se; but prior art valves that are capable of accommodating pressures on the order of 30,000 p.s.i. are not generally noted for their speed of operation. It should perhaps be pointed out, however, that 30,000 p.s.i. is not intended to be a limit on the usefulness of the valve disclosed herein. If stronger materials and better seals were conveniently available and employed, there would appear to be no reason to place any pressure limit on a valve designed in accordance with the invention. Since it is the pressure of the fluid that serves to hold the stem in position, increasing the pressure tending to open the valve will at the same time correspondingly increase the pressure holding the valve closed. When it is desired to open the valve 49, a fluid contained under high pressure is self-serving in that the high forces that accompany fluid at high pressures act to move the stem out of the way faster than would low forces from fluid at low pressures. Furthermore, the pilot element 57 can be made essentially as light and easy to move as seems desirable in view of the liquid or gas being contained, and pressures higher than 30,000 p.s.i. should pose no problem in properly sizing a pilot element.

While only one embodiment of the invention has been described in detail herein and shown in the accompanying drawing, it will be evident that various modifications are possible in the arrangement and construction of its components without departing from the scope of the invention.

What is claimed is:

1. Apparatus for selectively containing and releasing pressurized fluid in a pressure vessel wherein the pressure of the fluid contained in said vessel controllably acts to contain and release said fluid, comprising:

a generally cylindrical sleeve having a first end portion in communication with said pressure vessel, a second end portion and means for closing same, a port, a valve seat, and a discharge orifice;

a valve stem slidably movable within said sleeve, the stem having first and second end portions and a passage extending therebetween, said stem second end portion having an end face, the end face and said sleeve second end portion and a portion of the sleeve therebetween forming a sleeve chamber, said stem first end portion having a surface shaped for mating with said valve seat, the stem further having means blocking said discharge orifice when the stem is seated against said valve seat and unblocking said discharge orifice when said stem is unseated, said passage having a first opening in said stem first end portion communicating with said fluid-filled pressure vessel and having a second opening in said stem second end portion communicating with said sleeve chamber, the stem second end portion containing a cavity extending along the stem axis and having a first end wall intermediate the stem second end portion face and first end portion and a second end wall at the stem second end portion face, the stem having a port piercing the stem cavity second end wall and connecting the sleeve chamber to the stem cavity, the stem passage at all times providing free communication between the sleeve chamber, stem cavity, and pressure vessel, whereby the fluid pressures in said chamber, cavity, and vessel are always identical;

a pilot element within the valve stem cavity and movable therein between a first position in which the pilot element is spaced from the stem cavity first and second end walls and a second position in which the pilot element lies against the stem cavity second end wall, the pilot element, rod, and valve stem having respective surface areas so proportioned that the net, total surface area of the stem subjected to forces of fluid from the pressure vessel urging the stem toward the valve seat is greater than the area of the same subjected to fluid forces in the opposite direction when the pilot element is in its first position and such that the net, total surface area of the pilot element and valve stem subjected to forces of fluid from the pressure vessel urging the stem away from the valve seat is greater than the area of the same subjected to fluid forces urging the stem in the opposite direction when the pilot element is in its second position;

a rod member sealably extending through said sleeve port and extending through said stem port into rigid connection with said pilot element; and the rod member being rigidly connected to said pilot element; and means selectively operable to position the rod for holding the pilot element in its first position and for releasing the rod to permit the pilot element to move from its first to its second position.

References Cited

UNITED STATES PATENTS

| | | | |
|---|---|---|---|
| 2,020,833 | 11/1935 | Hansen | 251—29 X |
| 2,639,693 | 5/1953 | Miller et al. | 251—25 X |
| 2,795,391 | 6/1957 | Krone et al. | 251—43 X |
| 2,888,953 | 6/1959 | Gratzmuller | 251—25 X |

ARNOLD ROSENTHAL, Primary Examiner

U.S. Cl. X.R.

137—494; 251—76, 282